Solomon and Isaac Rawson.
Harvester.

No. 117460 — Patented Jul. 25 1871

Witnesses:

Inventors:
Solomon Rawson
Isaac Rawson
Per _____ Attorneys.

117,460

UNITED STATES PATENT OFFICE.

SOLOMON RAWSON AND ISAAC RAWSON, OF ALMOND, NEW YORK.

IMPROVEMENT IN HARVESTERS.

Specification forming part of Letters Patent No. 117,460, dated July 25, 1871.

*To all whom it may concern:*

Be it known that we, SOLOMON RAWSON and ISAAC RAWSON, of Almond, in the county of Allegany and State of New York, have invented a new and improved Harvester; and we do hereby declare the following to be a full, clear, and exact description of the same, reference being had to the accompanying drawing making a part of this specification, in which—

Figure 1:
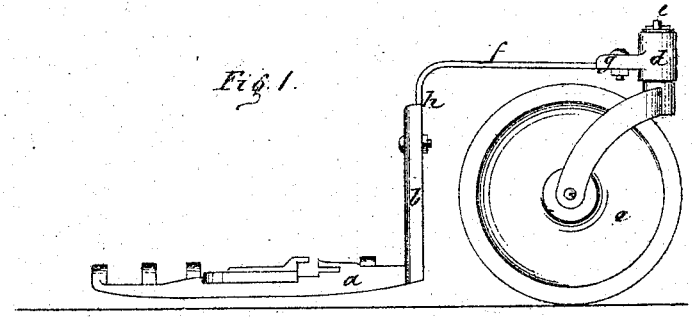
Figure 2:
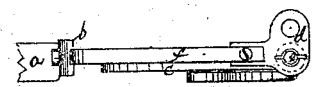

Figure 1 is a side elevation of our invention, and Fig. 2 a plan view of the socket attached to the spring.

Our invention has for its object improvement in the method of connecting the caster-wheel with the curved spring, and the spring with the shoe of the harvester, for which Letters Patent of the United States No. 109,755 were issued to us November 29, 1870, the function of the spring being to prevent the transmission to the shoe, and from thence to the finger-bar, of the shocks received by the caster-wheel from striking stones or other obstacles in its path. In that machine the spring is rigidly attached at one end to the hinged frame to which the finger-bar is hinged, and at its free end to a metal socket or flanged block, to which the plate, having suitable bearings for the pintle of the caster-wheel, is connected, so as to admit of its vertical and lateral adjustment. We have found, however, that the vertical adjustment of said plate is not practicable, since it interferes with the draft attachment of the harvester and with other operative parts. Beside this but one lateral adjustment is possible, owing to the peculiar construction of the socket attached to the spring. These and other difficulties have led to the present invention. It consists in forming the socket with a series of holes which permits corresponding lateral adjustment of the caster-wheel, and in providing for the vertical adjustment of the spring in a standard formed in one piece with or rigidly attached to the shoe, whereby it is securely braced or held against the torsion of the spring when the caster-wheel has been adjusted laterally or to the left. This construction also allows of the more easy and rapid adjustment of parts, while the cost of the machine is somewhat lessened.

Referring to the drawing, *a* is the inside shoe of the finger-bar of a harvester; *b*, a standard fastened at its lower extremity to the front end of the shoe *a;* *c*, a caster-wheel placed in front of the shoe; *d*, a socket having two or more orifices in which the pintle *e* of the caster-wheel may be inserted; *f*, a spring bolted at one end to the lug *g* that extends horizontally rearward from the side of the socket, the spring being bent downward at its rear end so as to form a vertical arm, *h*, which has a vertical series of holes made through it, or a slot for the purpose of receiving the screws or bolts which fasten the arm *h* to the standard *b*, the slot or series of holes admitting of the ready adjustment of the shoe at different heights from the ground, according to the nature of the surface of the field where the harvester is to be used. When the caster-wheel strikes a stone or other obstruction and mounts over it, however sudden may be its rise, it communicates no jerk to the shoe and finger-bar. The object of using a double socket is to allow the caster-wheel, when the field is stony and the grass light, to be set so far beyond the end of the finger-bar as not to turn up stones in the way of the cutter. Where the grass is heavy the caster-wheel should be inserted in the socket nearest the cutter-bar for the purpose of bending down the grass under the shoe.

Having thus described our invention, what we claim as new, and desire to secure by Letters Patent, is—

The socket *d* provided with two or more orifices, the spring *f h*, and standard *b* rigidly connected with the shoe *a*, all arranged as shown and described.

SOLOMON RAWSON.
ISAAC RAWSON.

Witnesses:
WESLEY BROWN,
JESSE B. GIBBS.